No. 759,386. PATENTED MAY 10, 1904.
C. J. LUCE.
COTTON PRESS.
APPLICATION FILED JULY 2, 1902. RENEWED MAR. 3, 1904.
NO MODEL. 6 SHEETS—SHEET 3.

No. 759,386. PATENTED MAY 10, 1904.
C. J. LUCE.
COTTON PRESS.
APPLICATION FILED JULY 2, 1902. RENEWED MAR. 3, 1904.
NO MODEL. 6 SHEETS—SHEET 5.

Inventor
C. J. Luce

Witnesses

By
Attorneys

No. 759,386. Patented May 10, 1904.

UNITED STATES PATENT OFFICE.

CHARLES J. LUCE, OF NIANTIC, CONNECTICUT, ASSIGNOR TO THE LUCE COMPRESS & COTTON COMPANY, A CORPORATION OF DELAWARE.

COTTON-PRESS.

SPECIFICATION forming part of Letters Patent No. 759,386, dated May 10, 1904.

Application filed July 2, 1902. Renewed March 3, 1904. Serial No. 196,440. (No model.)

*To all whom it may concern:*

Be it known that I, CHARLES J. LUCE, a citizen of the United States of America, and a resident of Niantic, State of Connecticut, have invented certain new and useful Improvements in Cotton-Presses, of which the following is a specification.

My invention relates to improvements in cotton-presses wherein I feed the cotton by appropriate mechanism to form a wad and in this condition lay it down in layers, folding the layers one upon the other.

It is well known that attempts have been made to employ expedients to compress cotton and other fibrous material, but without any degree of commercial success. I have discovered and demonstrated that success in this connection can be obtained by providing appropriate mechanism to first gather the cotton and semicompress it into a continuous wad and then force and deliver such semicompressed wad under a constant and uniform pressure to a point where it will meet the compression mechanism, for where the web of cotton is led between a reciprocating platen and a pressure-head without first placing it under pressure it will be pushed in advance of the platen and will ultimately accumulate and choke the mechanism and retard further movement of the parts. In carrying out my invention I have sought to surmount these objections and to do so have arranged appropriate means whereby a wad is formed between the hopper and the point where the bale-compression begins. To perform this highly-important function, the mechanism for carrying it out must be arranged to deliver the cotton into what I term a "throat," thence to the platen faster than the latter can compress it. It is this joint action of the parts which enables me to accumulate and semicompress the cotton in the throat, and inasmuch as the supply is constant so long as the platen moves it will be but a short time before a wad is formed. I have stated that the supply of cotton is constant. Then there will eventually be a time when the pressure of the wad will reach a predetermined limit, and to meet this emergency, coupled with the fact that other exigencies are likely to come about to choke the feed, I provide means which will retard the supply of cotton and yet at all times maintain a downward pressure toward the bale. Immediately the obstruction is removed the feed will continue.

Another important defect in presses of this type known to me is the fact that the cotton is fed continually to the reciprocating platen notwithstanding the fact that the latter stops at the end of each reciprocation, the supply of cotton being continued and the platen making numerous stops during the process of forming a bale. Obviously a bale thus formed is bunchy at its ends. The interval between the change of the direction of the reciprocation is short, it is true; but since these intervals are numerous in the formation of a bale the bunchy ends become quite noticeable. It is one of the purposes of this invention to overcome this objection by providing mechanism to lay down the cotton in layers only while the platen is reciprocating—that is to say, at the termination of each reciprocation of the platen the supply of cotton thereto ceases and immediately the next reciprocation commences while the folding of the wad takes place, the feed preferably starting later than the reciprocation, insuring a bale being made whose ends will be as uniform in thickness as any other part.

This invention also comprehends improvements in the means employed for positively advancing and revolving the platen members while the latter are in transit from one side of the press to the other in the operation of compressing a bale. Such positive movement of the members avoids pinching the wad, inasmuch as it is under pressure. The combined advancing and revolving action forces it downwardly and readily compresses it.

With these general objects in view it is my purpose to construct a press having as its characteristic features, first, means for semicompressing the cotton into a wad and maintaining it under a downward pressure throughout its whole extent; second, a reciprocating platen composed of a plurality of revolving members arranged to lay down the wad in folded layers and compress it while it is under continuous pressure into a bale, and, third, suitable mechanism to deliver the wad to be compressed.

In the accompanying drawings, forming a part of this specification.

The numeral 1 indicates the supporting-legs, 2 2 a pair of longitudinal sills, and disposed above and spaced from the sills 2 2 are like sills 3 3, forming a suitable frame for supporting the operating mechanism. Interposed between the two pairs of sills are a series of revolving members 6, preferably eight in number, for forming an ordinary bale of cotton. It is to be understood that inasmuch as these members materially assist in forming a bale of cotton the number may be increased or decreased, as the circumstances may require, without departing from the spirit of my invention. Side plates 7 7, mounted on the upper sills 3 3 by hangers 8 8, have openings 9, through which the members 6 pass and are maintained in substantial alinement, the side plates also forming a part of the hopper. The members 6 are disposed in two sets, four in each set, the sets being separated to form an aperture 10, through which the wad passes. For the sake of clearness and as they form one of the prime elements to compress the cotton I will hereinafter refer to the members 6 and the side plates as a "platen."

Figure 1:
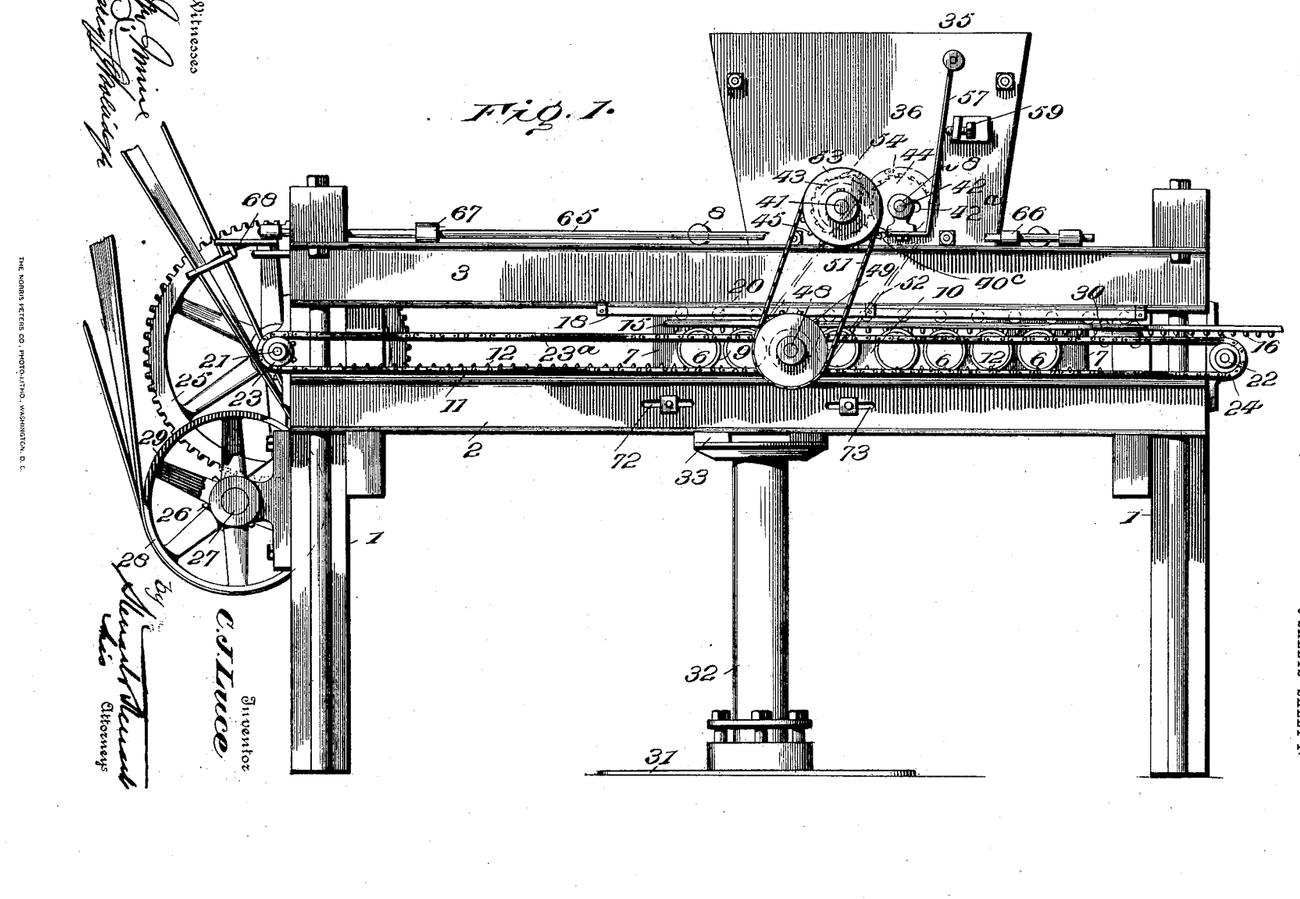
Figure 1 is a side elevation of my improved press.
Figure 2:
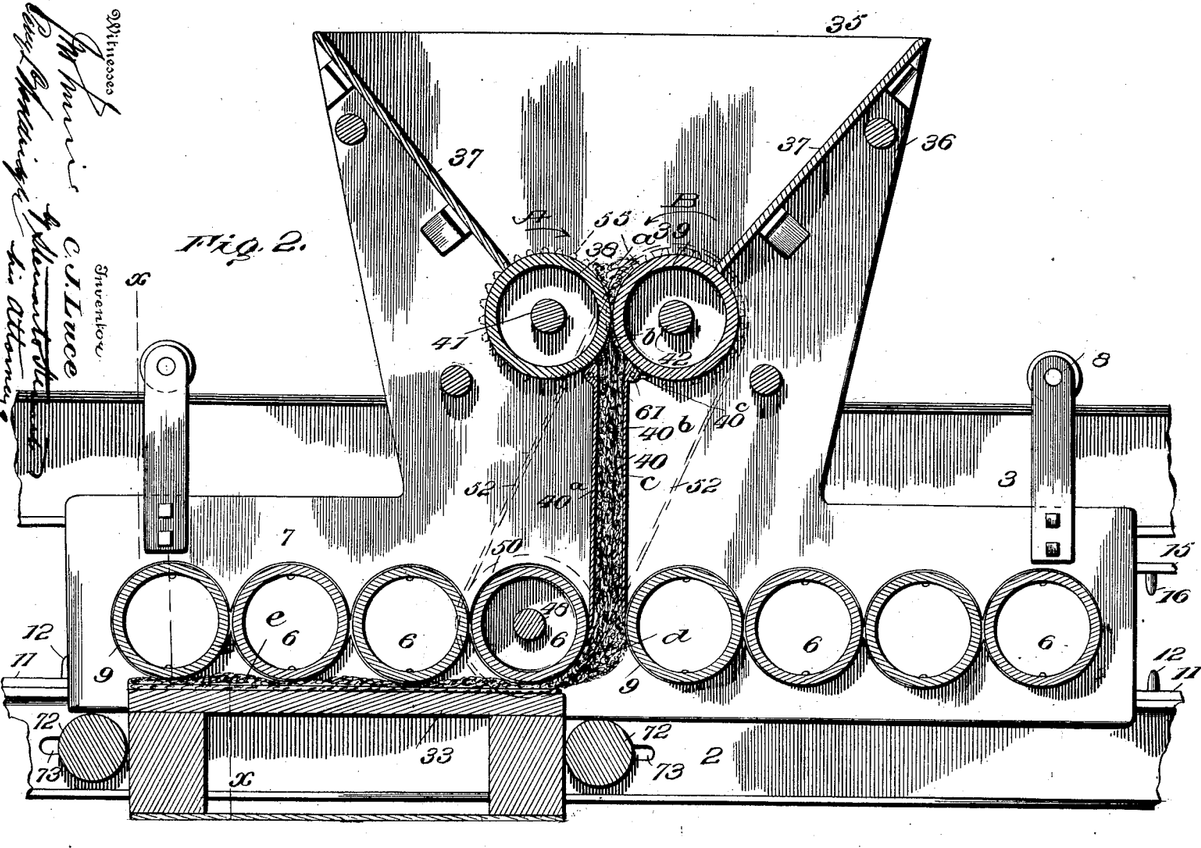
Fig. 2 is an enlarged vertical section taken through the hopper and the compressor.
Figure 3:
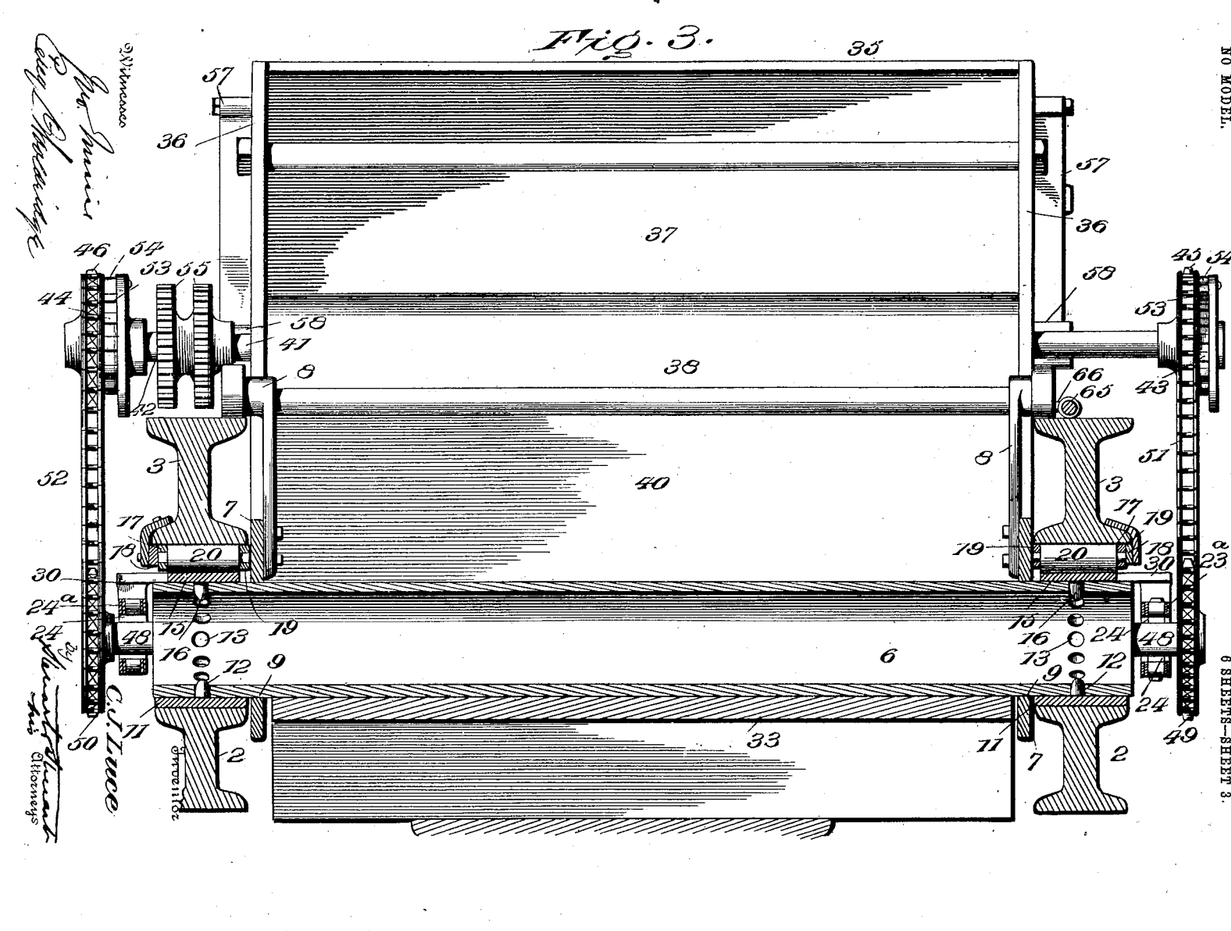
Fig. 3 is an enlarged transverse section of the same on the line $x$ $x$ of Fig. 2.
Figure 4:
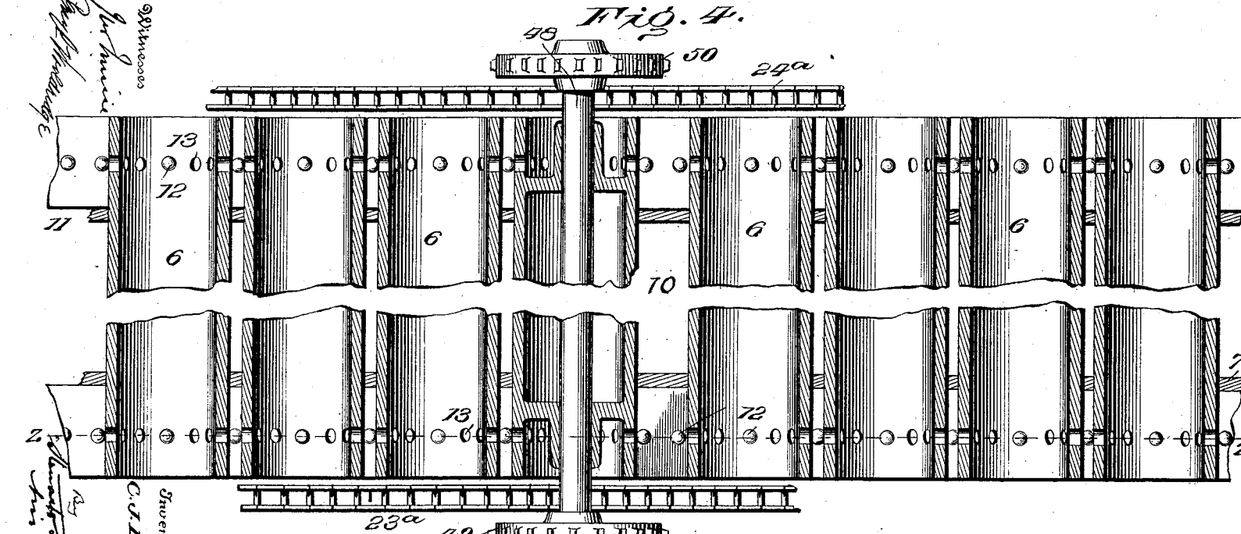
Fig. 4 is an enlarged horizontal section of the platen on the line $y$ $y$ of Fig. 5.
Figure 5:
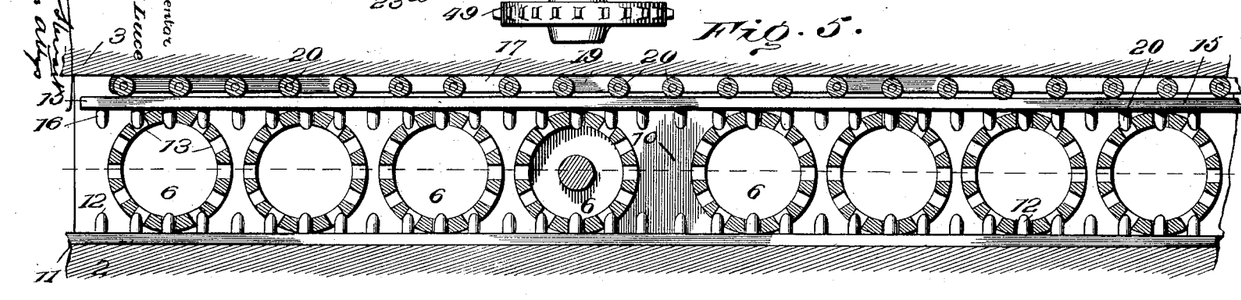
Fig. 5 is an enlarged vertical section on the line $z$ $z$ of Fig. 4.
Figures 11, 12:
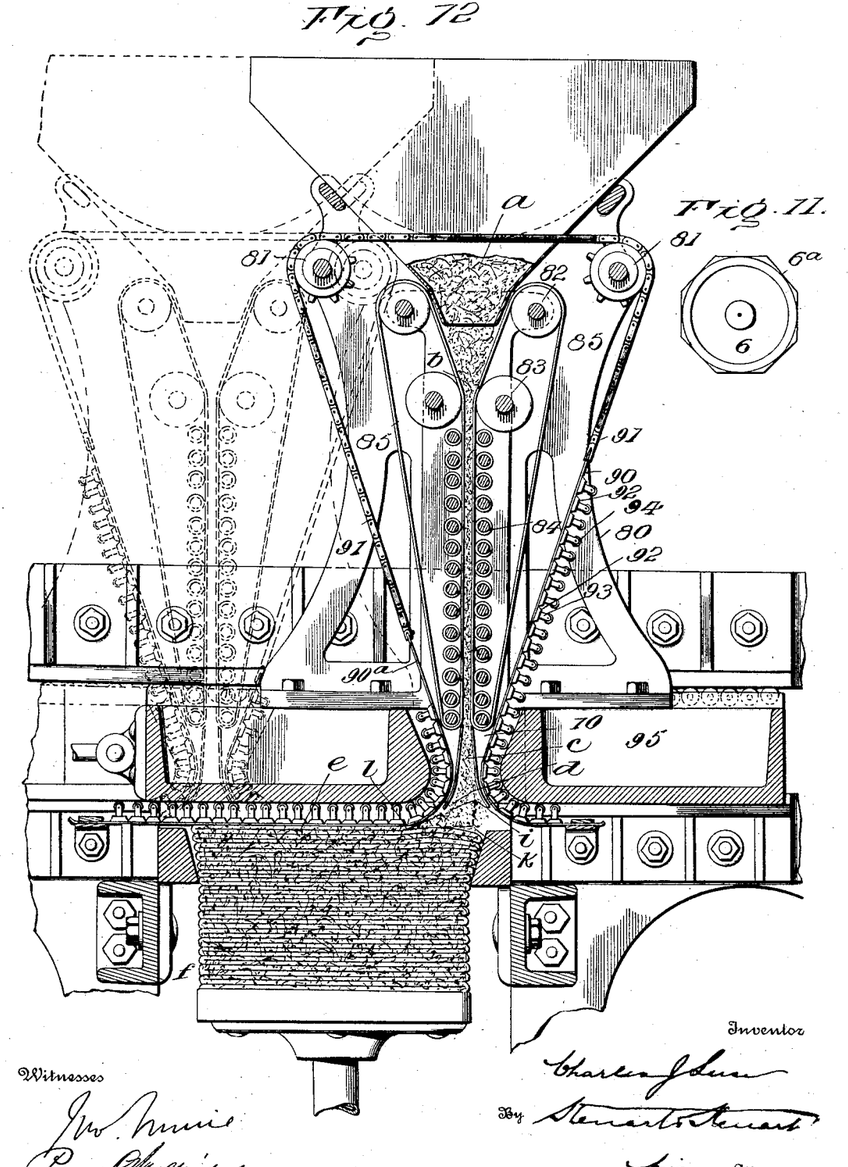
Fig. 11 is a detail view of a modified form of platen.
Fig. 12 is a vertical section of a modification of my invention.

The platen may be composed of a plurality of flat surfaces $6^a$, either in the form illustrated in Fig. 11 or as shown in Fig. 12. Fig. 11 represents a platen member similar in all respects to the preferred form shown in Figs. 1 and 2, &c., except that the flat surfaces $6^a$ are provided. The operation of this modification is in all essential details the same as the rounded surfaces in so far as the movement of the platen is concerned; but a slightly different action in compressing the wad takes place as the platen reciprocates, which I will hereinafter refer to in describing the operation of the press.

Stationary tracks 11 11 are rigidly fastened to the upper side of the sills 2 2, bearing a plurality of equally-spaced pins or teeth 12. At or near the outer ends of the members 6 are a series of openings 13, designed to engage with the teeth 12, which is the means I employ to positively insure the members turning uniformly and at a predetermined speed, which is of the greatest importance toward laying the web down in layers with a machine carrying a reciprocating platen composed of movable parts. Resting on the upper side of the members 6 are traveling tracks 15, bearing a plurality of teeth 16, similar to and in all respects the same as the teeth 12 of the stationary tracks 11. Teeth 16 engage the openings 13, and to reduce and relieve the friction incident to the upward pressure when a bale is being formed a traveling frame 17 is interposed between the lower side of each of the sills 3 3 and the tracks 15, such frame being retained against lateral displacement by guide-strips 18 and the side plates 7. Each traveling frame comprises side bars 19, in which are mounted antifriction-rollers 20, the frame being free to move with the platen.

At the ends of the press are counter-shafts 21 and 22, bearing sprocket-wheels 23 and 24, engaged by sprocket-chains $23^a$ and $24^a$. The shaft 21 carries a gear-wheel 25, which meshes with a pinion 26 on a shaft 27, which has mounted thereon fast and loose pulleys 28 and 29, engaged at the appropriate time by a straight and a twisted belt. From each of the traveling tracks 15 projects a lug 30, made fast to the respective sprocket-chains $23^a$ and $24^a$, so that motion is transmitted from the fast pulleys 28 and the gears through the medium of the sprocket-chains $23^a$ and $24^a$ to the traveling tracks 15. The movement of these tracks in either direction imparts a reciprocating movement to the platen and also a rotary movement to the members 6, and as such motion is transmitted by the teeth 16 positively, and, furthermore, because of the teeth 12 being stationary, it is obvious the members are turned with the least possible power.

31 is a hydraulic cylinder suitably mounted and having a piston and piston-rod 32 operating therein, and 33 is a pressure-head mounted on the piston-rod 32, and the pressure-head is provided with grooves 71. The head 33 is normally forced up toward the platen, and between it and the platen the bale is compressed.

35 is a hopper mounted to travel with the platen and comprises sides 36, which are extensions of the plates 7, inclined ends 37, and a pair of feed-rolls 38 and 39, forming the bottom. A throat 40 is fitted between the feed-rolls and receives and directs the wad of cotton to and under the platen. This throat consists of a pair of plates $40^a$ and $40^b$, hinged at 61 and have their upper and lower edges beveled, the upper edge fitting to a nicety the under side of the feed-rolls 38 and 39, while the lower edges fit into the aperture 10 and bear against the adjacent members 6. The rod on which is mounted the plate $40^b$ is passed through slots $40^c$ in the sides of the hopper and is fastened to the bearings 58 of the shaft 42. The feed-rolls 38 and 39 are mounted on shafts 41 and 42, bearing ratchets 43 and 44 and sprocket-wheels 45 and 46. One of the members 6 carries a shaft 48, bearing sprocket-wheels 49 and 50 at the ends, and engaging the sprocket-wheel 49 and sprocket-wheel 45 is a chain 51, while the sprocket-wheels 50 and 46 are engaged by a chain 52. The ratchets 43 and 44 are mounted loosely on their respective shafts, and each consists of a ratchet-wheel made integral with the sprocket-wheels 45 and 46, the teeth of the ratchet-wheels being disposed in an opposite direction to each other. Disks 53 are made fast to the shafts 41 and 42 and carry pawls 54 to be engaged by the teeth of the wheels 43 and 44. The two shafts 41 and 42 are connected together by gears 55, so that motion imparted to either of said shafts will be transferred to the other. If the platen is moving toward the right, pawl 54 engages the teeth of the ratchet 43 and revolves its respective roll 38 in the direction of the arrow A, Fig. 2, hence the roll 39, in such manner that the cotton will be delivered into the throat, where it is semicompressed into a wad to be acted on by the members 6. In the meantime ratchet 44 and its pawl are inactive. On the other hand, if the platen is moved toward the left, the teeth of the ratchet 44 will engage its respective pawl 54 and revolve the roll 39 in the direction of the arrow B, Fig. 2, hence the roll 38 in exactly the same direction as before described, the ratchet 44 and its pawl in the meantime being inactive. It matters not then which way the platen reciprocates—the feed-rolls will always revolve in the direction of the arrows A B. The letter $a$ designates the cotton thrown into the hopper 35 as it comes from the gin.

$b$ is the cotton as the same is passed between the feed-rolls 38 and 39, and $c$ is the cotton as it arrives in the throat—that is to say, between the shields $40^a$ and $40^b$—and $d$ is the cotton as the same is being forced or fed beneath the pressure mechanism while it is being laid down in folds.

$e$ represents the folds or layers of cotton, and $f$ is the bale formed of layers of cotton.

There will be conditions arise while forming a bale whereby the throat will become choked if means are not provided to relieve the pressure after a wad of predetermined density has been formed. To meet this emergency, the shaft 42 and its roll 39 are mounted to be thrown out of contact with the companion roll 38 a sufficient distance to stop the feed of cotton from the hopper. Shaft 42 passes through slots $42^a$ in the sides of the hopper and is journaled in bearings 58, mounted on springs 57. Suitably mounted to adjust the tension of these springs, which is the factor to determine the degree of density of the semi-compression of the wad of cotton, adjusting-bolts 59 are located adjacent each of the springs and bear directly thereon.

It may be well to here reiterate the fact that it is my purpose to feed the cotton into the throat faster than it is being folded and laid down in layers to form the bale by the platen. Immediately therefore the frictional resistance between the rolls and the wad is overcome and stops the supply of cotton. Not only do the springs yield for this purpose, but obviously if any irregularity exists in the cotton-stock the springs will give just the same. While the rolls have been separated sufficiently to retard introduction of cotton, it is to be borne in mind that their separation does not stop their revolutiont. Therefore the downward pressure of the wad is maintained just the same.

To make the reciprocal movement of the platen automatic, a rod 65 is mounted to slide in suitable bearings on one of the sills 3 and has two lugs 66 and 67, the former being engaged by the right side of the hopper when the platen is moving to the right, the lug 67 being engaged by the other side of the hopper when the movement of the platen is reversed. A bell-crank lever 68 is connected to the outer end of the rod 65 and carries loops which engage the power-belts and shift said belts from either the fast or loose pulleys, or vice versa. As this feature of reversing of the movement of parts is so well known, I have not thought it necessary to show it further than in a conventional form.

Power for the maintenance of a uniform pressure upon the bale during the period that the layers of cotton are being laid down is derived from a hydraulic engine or any other motor, engine, or mechanism whereby a suitable degree of pressure may be developed and whereby such pressure may be maintained upon a pressure-head and at the same time the head be permitted to recede an increment of movement as the bale is increased in size as the successive layers of cotton are laid one upon the other in the formation of the bale. Devices of this nature are familiar in the art, such as screw devices or devices operated by sources of power such as steam, hydraulic, or otherwise. I deem it, therefore, unnecessary here to do more than to refer to the same as I have done, and to indicate in my drawings a cylinder 31 and piston-rod 32, with a pressure-head 33. When I start to compress a bale, I introduce pressure into the cylinder and cause the pressure-head to rise until it bears upon the platen with a degree of pressure suitable for the compression of each layer of cotton as it is laid down by appropriate mechanism. I intend in the operation of my press to subject the cotton to a high degree of pressure. As each layer is laid down the pressure-head recedes a fixed increment of movement; but its recession may be made at less frequent intervals as to each second, fourth, or sixth layer, as found most convenient, my purpose being that it shall recede sufficiently to permit the cotton to be laid down, and thus piled up layer by layer, and yet that an even pressure shall be maintained.

Cotton is introduced into the hopper 35 by any convenient means as it comes from the gin—by its own weight or by any appropriate means. It is then fed between the feed-rolls 38 and 39, and as it passes therethrough it is semicompressed into a continuous wad in the throat. It is to be noted that the cotton fed between the rolls once fed into the throat is confined, and it is to be understood that the wad from the very beginning of its formation is forced down by reason of the pressure of the feed from the hopper and is delivered to the press in a continuous wad under constant pressure throughout its whole extent. This feature of my device I regard of importance, as in so doing I deliver the cotton to the bale-forming mechanism under pressure—that is to say, I semicompress the cotton, forcing it under pressure through the throat to the point where it is taken up by the advancing pressure mechanism. This pressure is exercised by the cotton which is fed between the rolls being forced or pressed thereby down upon the cotton in the throat, in like manner bearing upon the cotton in contact with the pressure-head or bale in position to be pressed. It will therefore be understood that an even and constant pressure downward is maintained by my mechanism upon the cotton wad in the throat and below the throat and that this degree of pressure is substantially equal to the friction between the rolls 38 and 39 and the wad.

In practice I may adjust the driving mechanism of the feed to move faster than the mechanism for laying the cotton down in layers; but it will be understood that it is immaterial as to what such adjustment may be, so long as the feed is sufficient to supply the laying-down mechanism with cotton in a way to deliver the wad to the point where it is acted upon under a sufficient degree of downward pressure to insure its safe and constant delivery at that point. As has been before stated, it will be appreciated that in the feed mechanism shown should the downward pressure of the wad upon the entire cotton below exceed the friction between the rolls and the wad the rolls will slip on the cotton, and the downward pressure will remain the same.

Concerning the feeding mechanism, I am aware that cotton has been fed between rolls to form a web or bat, and this web or bat has been fed and guided to a point in a machine of this nature where it has been laid down by a reciprocating platen, &c.; but I believe the invention to be new with me to feed and guide the cotton to the point where it is subjected to pressure into the bale form under a positive uniform degree of feed-pressure to semicompress it, such as to deliver the cotton to the point where it is to be finally pressed by a positive and certain feed in a semicompressed wad.

Heretofore the cotton has been permitted to pass from the apparatus by which it has been pressed into a web or bat into the throat of a press of this nature without positive guides or positive mechanism for delivering the same at the point where the pressure was to be exerted upon it. I have found that such structures are insufficient by reason of the fact that the cotton web or bat is of such a light and flimsy nature that it cannot be relied upon to bear any pulling or pushing strain. It will invariably separate and then become tangled and matted in the operative parts of the mechanism.

I will now describe the operation of the mechanism by which I lay the cotton down in layers and press the same.

The platen has a central aperture 10 transverse of its center, and the walls of this aperture are formed by the members 6. Hence it is in the arc of a circle. As stated, the platen is mounted to reciprocate between the two tracks 11 and 15, and antifriction devices are provided to facilitate the reciprocating movement of the platen when it is subject to the pressure of the pressure-head 33, and power is applied to reciprocate the platen.

As heretofore narrated, the cotton is crowded down into the throat, filling the same, and is pressed down against the pressure-head 33 when the bale is first started or against the bale after the press is in motion. When the movement of the platen is toward the right, (as in Fig. 6,) the wad is forced down in contact with the bale and by the movement of the platen that portion of the wad within the throat is carried forward, while that portion in contact with the bale is held by such contact in position to be laid down and pressed by the members 6. It will be noted that under the higher degree of pressure under which my machine operates the cotton of the bale is forced up into the aperture 10 to a degree sufficient to form a slight elevation above the level of the bottom of the members 6, (indicated at $g$, Fig. 10,) and I have noticed that this transverse elevation becomes a factor in the operation of my press. I have discovered that by making the members 6 about six inches in diameter and the aperture two and one-eighth inches the angle formed by the periphery of the rollers 6, forming the wall of the aperture with the plane on which the wad is to be laid down, enables me to lay the wad of cotton down with great precision and accuracy and without many of the difficulties which have been heretofore experienced; but I do not desire to be limited to the proportions of the members and the aperture, however, those mentioned give exceedingly satisfactory results.

Figures 6, 7, 8, 9, 10:
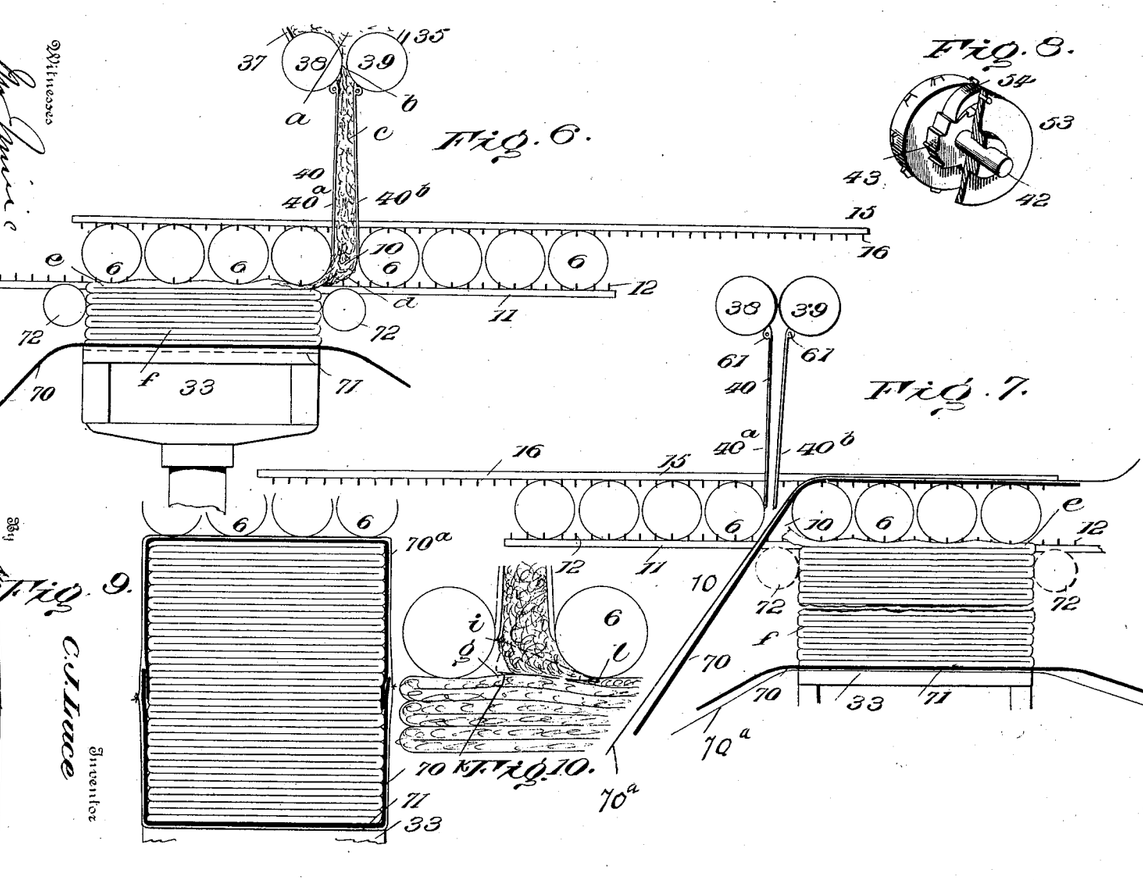
Fig. 6 is a diagrammatic view showing the movable platen as having reciprocated to the extreme right.
Fig. 7 is a similar view, but showing the movable platen moved to the extreme left.
Fig. 8 is a detail view of a ratchet employed in connection with the hopper.
Fig. 9 is a diagrammatic view illustrating the platen as having moved to the right to apply the cover and tying-bands.
Fig. 10 is a detail diagrammatic view illustrating the action of the platen on a layer as the latter is being laid down.

Heretofore in the operation of a press of this type where the platen is composed of movable parts the tendency of such parts has been to force the cotton before them, which crams and clogs the apparatus; but I have discovered that by arranging the relative proportions in such manner as to enable the members 6 to readily take hold of a compressed wad and confine the wad between the platen and the pressure-head by a downward force or after the first layers are laid between the platen and the bale as the platen is moved forward the wad bearing upon the bale is held in position to be acted upon by the members 6, as the pressure is gradual until parallel with the bottom of the platen. Power being applied to reciprocate the platen, as illustrated in Fig. 7, the chains 23$^a$ and 24$^a$ will pull the traveling tracks 15 toward the right, and by reason of the tracks drawing over the outer periphery of the members 6 the teeth 16 will engage the openings 13, and a free revoluble motion is imparted to the said members. The traveling tracks and the teeth pull the peripheries of the members and in so doing necessitate their revolution, which is positively assured by reason of the openings adjacent the stationary tracks being engaged by the teeth 12. These teeth therefore prevent any slipping of the members, and as they must engage the openings 13 a positive revoluble and advance movement is imparted by the traveling tracks. Hence I not only positively revolve the members to avoid crimping of the wad of cotton, but I simultaneously and positively advance the members to compress the wad as it is fed into the aperture 10. In order that this double action of the members may be accomplished economically, as well as with the least possible resistance and friction, the traveling tracks travel substantially twice the travel of the platen. It is this movement which enables me to apply the necessary power to the members to effectually stand the strain incident to the high pressure required in a press of this type. In other words, by applying a horizontal movement to the peripheries of the members I am able to accomplish a beneficial result by advantageously obtaining and distributing leverage.

The high pressure upward while a bale is being formed necessitates means for reducing the friction to a decided minimum, and this I do by interposing the traveling frames intermediate the traveling tracks and the sills 3. These frames are free to travel with the track, so that as the tracks advance to the right or left (bearing in mind they are under upward pressure) the antifriction-rollers reduce the friction—doubly so when it is considered these rollers are free to travel with the tracks.

As before narrated, a continuous wad of cotton is being fed through the throat into the aperture 10 under the platen. (See Fig. 6.) This feeding of the wad will be continuous only through the reciprocal movement of the hopper and platen, so that at the end of each stroke or the completion of the laying on of a layer of cotton the wad is compressed as it is introduced to the platen. The platen having reached the end of the stroke to the right, Figs. 1, 2, and 6, the stop 66 is struck, which brings to a standstill the platen and the coöperating elements, only, however, to be started again in the opposite direction toward the left. During the interval between the change of the direction of the reciprocation of the platen no wad is being fed, there being just sufficient cotton to form a neat fold for the next successive layer, when the right-hand set of members of the platen advances toward the left. There is a slight lost motion between the time of starting of the platen and the starting of the feed of the hopper-rolls, due to the changing of the ratchets, and it is at this time that the feed is suspended and the end folds formed. This operation is continued until the bale has reached the desired size, whereupon the bale-cover is applied, together with the tying-bands.

Referring particularly to Fig. 7, assume the platen to have been moved toward the right and the bale having reached the contemplated size. The lower part of the cover 70 having been placed on the head 33 before the latter was placed under pressure and as the said head is provided with grooves 71 to receive the tying-bands, it only remains to supply the upper part of said cover and the bands in order to complete the bale. To do this, the operator stops the supply of cotton to the hopper, and when the throat is clear one of the shields is swung inwardly, and a piece of covering 70 and the tying-bands 70$^a$ are inserted in the aperture 10. The upper part of the cover 70 and the bands 70$^a$ are at this time free; but immediately the reciprocation of the platen commences they are laid down just like a layer of cotton and made a part of the bale. When the platen has thus placed the upper part of the cover and the bands, the rolls 72 are removed, and the free ends of the cover which rest upon the platen are pulled down, the ends of the lower cover are gathered up, whereupon the bands are fastened together in any suitable manner. This means of applying the cover and the bands makes it possible to tie the bale parallel with the layers and embrace the folds without removing the bale from between the head and the platen. I therefore maintain in a completed bale the pressure utilized in compressing the layers of cotton, as all possibility of expansion is prevented, for in a bale of cotton of this character the first part thereof which tends to expand is the folds. These folds being within the grasp of the bands and the latter having been applied when the bale was under original pressure, obviously any expansion will be immediately retarded.

While the bale is being formed it has a tendency to sag a trifle at the ends, and to obviate this difficulty guide-rollers 72 72 are mounted in the sills 2, distanced from each other equal to the width of the contemplated bale, and that these rollers may be adjusted to accommodate bales of various sizes they are mounted in slots 73 and are held in a locked position by binding-nuts or other fastening devices.

Referring particularly to the modification disclosed in Fig. 12, 80 80 are upright supports suitably mounted on the platen, and 81 81 are shafts bearing sprocket-wheels. 82 82 are shafts bearing rollers, and 83 83 are companion shafts and rollers. A plurality of rollers 84 are mounted in parallel alinement below the shaft and rollers 83. 85 85 are endless belts run about the rollers 82, 83, and 84. The rollers 82 are so disposed with relation to the rollers 83 as to form an open mouth when the belts 85 are in place, and the lower end of the hopper fits this open mouth to feed the cotton therein. Extending from the lowermost roll 84 are the shields to form the throat, the lower ends of said shields terminating in the aperture of the platen. The cotton is fed from the hopper between the belts 85 85, and as it passes between the belts it is pressed into a web, and as the belts move the cotton is forced down by reason of the friction upon the same, which semicompresses it and forces it downward. It is fed in this semicompressed state into the throat under pressure to the point where it is taken up by the advancing pressure mechanism. It will be appreciated that should this downward pressure of the wad upon the cotton below exceed the friction between the belts 85 85 and the wad the belts will slip on the wad and the downward pressure will remain the same until the obstruction is removed. This action is the equivalent of the spring movement of the rolls 38 and 39. 90 and $90^a$ represent belts, which may be of any suitable material—such as leather, textile fabric, or flexible metal—to be secured at opposite ends of the press-frame. To the inner ends of the belts 90 and $90^a$ I secure a chain 91, and this chain passes over the sprocket-wheels 81 81. 92 represents bars formed with flat surfaces on the under side and on the upper side support suitable brackets, as at 93, carrying friction-rollers 94. The platen 95 has a central aperture 10, through which the belts and its antifriction devices pass, so that any reciprocal movement given the platen will impart a movement to the belts to lay down the layers of cotton. I prefer to mount the bars edge to edge and secure their flat surfaces to the belt. I also bevel the sides of the bars so that they may without interference one with the other turn about the periphery of the arc of the central slot of the platen. The belts, chains, and bars form, therefore, a continuous belt secured at each end, passing through the aperture and over the sprockets, and any reciprocal movement of the platen will draw and redraw the belts through the aperture, so that as one is descending the other is ascending. It is to be understood that the walls of the aperture form bearing-surfaces for the belts and that they may form any suitable arc of a circle which will permit the belts to be readily moved upon said surfaces. The pressure-head is operated in substantially the same manner as that hereinbefore referred to in connection with the preferred form of my invention. The operation of this structure is substantially the same as before described, except that the action of the faces of the bars act on the elevation $g$ in a slightly-different manner and the semicompressing means is slightly different in structure; but they operate in the same way.

In regard to the flat surfaces it is to be observed that a continuous surface is formed without intervening depressions where the cotton is first compressed by the movement of the platen. The field of operation of the pressure mechanism is within the approximate triangle $i \, k \, l$, Fig. 10, and in substantially the same manner as with the numbers 6, except that one after the other the surfaces in the advance of the platen will confine the cotton between it and the top of the pressure-head or after the first layers are laid between the surfaces and the top of the bale in a parallel relation, which has a tendency to hold it and carry it down parallel with the bale.

The action of the surfaces $6^a$ of the member shown in Fig. 11 is about the same as that of the bars—that is, in so far as the compressing action is concerned. This modification then combines the action of the structures shown in Figs. 1, &c., and Fig. 11.

While I have described my press as adapted for the baling of cotton, I do not intend to limit myself to that use, for it is capable of use in the compression of a variety of materials, which I deem it needless to enumerate.

While it is contemplated to employ the various elements herein in the relation shown, yet they may be used in other combinations, and some may be employed with the others, and the invention extends to such use.

Where in the claims I use the expression "without relieving the pressure on the wad" or again use the expression "means for feeding the wad under the said platen under a continuous pressure through its whole extent" I intend to convey that the material thus conveyed is maintained continuously under pressure, not necessarily continuously under the same pressure, but continuously under a degree of pressure throughout its entire extent.

What I claim as new is—

1. In a baling-press, the combination with means for forming a continuous wad, of means for feeding the wad under continuous pressure throughout its whole extent, and means for forming the wad into a bale without relieving the pressure on the wad.

2. In a baling-press, the combination with a platen and means for operating the same, of means for forming a wad under pressure, means for feeding the wad under the said platen under continuous pressure throughout its whole extent, said platen operating to form the wad into a bale.

3. In a baling-press, the combination with a reciprocating platen, and means to reciprocate the same, of means for forming a wad under pressure, and means for feeding the wad under the platen under continuous pressure throughout its whole extent, said platen operating by its reciprocation to form the wad into a bale.

4. In a baling-press, the combination with a platen having an aperture therein, and means for operating said platen, of means for forming a wad under pressure, and means for feeding the wad through said aperture, and under said platen under continuous pressure throughout its whole extent, said platen operating to form the wad into a bale.

5. In a baling-press the combination with a reciprocating platen, having an aperture therein, and means to reciprocate said platen, of means for forming a wad under pressure, and means for feeding the wad through said aperture and under said platen, under continuous pressure throughout its whole extent, said platen operating by its reciprocation to form the wad into a bale.

6. In a baling-press, the combination with means for forming a wad, of a platen having an aperture therein, a throat mounted in said aperture, means to constantly force said wad into said throat under a continuous forcing pressure and means to form said wad into a bale without relieving the pressure from said wad.

7. In a baling-press the combination with means for forming a wad, of a reciprocating platen having an aperture therein, a throat mounted in said aperture, means to constantly force said wad into said throat under a constant pressure, and means to reciprocate said platen to form said wad into a bale, said bale being formed without relieving said wad from pressure.

8. In a baling-press, the combination with means for forming a wad, of a reciprocating platen having an aperture therein, a throat mounted in said aperture, of means to force said wad into and through said throat under a constant forcing pressure, and means to reciprocate said platen to form said wad into a bale, said bale being formed without relieving said wad from pressure.

9. In a baling-press, the combination with a platen having an aperture therein, and means for operating said platen, of means for forming a wad, and means for forcing said wad through said aperture under said platen without relieving said wad from pressure, said forcing means yielding when a fixed degree of resistance is opposed to its operation and operating again upon the removal of such resistance, said platen operating to form said wad into a bale.

10. In a baling-press, the combination with means for forming a bale, of a platen having an aperture therein, and means to constantly force material to be baled into said aperture under a constant forcing pressure, said forcing means being adapted to yield when a fixed degree of resistance is opposed to its operation, and to operate again upon the removal of such resistance.

11. In a baling-press, the combination with means for forming a bale, of a platen having an aperture therein, a throat mounted in said aperture, means to force the material to be baled into said throat under a constant forcing pressure, said forcing means being adapted to yield when a fixed degree of resistance is opposed to its operation, and to operate again upon the removal of such resistance.

12. In a baling-press, the combination with a pair of feed-rolls for forming and feeding a wad under constant pressure throughout its whole extent, of means to which said pair of rolls delivers said wad to form the same into a bale, said bale being formed without the pressure on said bat being relieved.

13. In a baling-press, the combination with a reciprocating platen, and means to reciprocate the same, of a pair of rolls for forming and feeding a wad under constant pressure throughout its whole extent to said platen, said wad being formed into a bale by said platen without the pressure on said wad being relieved.

14. In a baling-press, the combination with a platen having an aperture therein, a throat mounted in said aperture, and means to operate the platen, of rolls oppositely disposed and mounted at the entrance of the throat, means to operate said rolls with sufficient speed to force material to be baled through the same into the throat, and to crowd the material within the throat until a high degree of pressure is exerted upon material within the throat, the feed operating faster than the platen can form the material into a bale, and means for allowing the rolls to be separated when the pressure reaches a certain degree.

15. In a baling-press, the combination with means for forming a wad, of means for feeding said wad under pressure, means for forming said wad into a bale without the pressure on said wad being relieved, said feeding means operating faster than said baling and forming means, and means for preventing more than a fixed amount of pressure being exerted on said wad by said feeding means.

16. In a baling-press, the combination with a platen, means for operating the platen, of means for forming and feeding a wad under pressure to said platen without relieving the pressure on said wad, said platen operating to form said wad into a bale, said feeding means operating faster than said bale-forming means, and means for preventing more than a fixed amount of pressure being exerted on said wad by said feeding means.

17. In a baling-press, the combination with a platen provided with an aperture, means for operating said platen, of means for feeding and forming a wad under pressure through said aperture in said platen, said platen operating to form said wad into a bale without relieving the pressure on said wad, said feeding means operating faster than said bale-forming means, and means for preventing more than a fixed amount of pressure being exerted on said wad by said feeding means.

18. In a baling-press, the combination with a reciprocating platen having an aperture therein, means to reciprocate said platen, of means for forming a wad, means for feeding said wad under pressure through said aperture in said platen, said platen operating by its reciprocation to form said wad into a bale without relieving the pressure on said wad, said feeding means operating faster than said bale-forming means, and means for preventing more than a fixed amount of pressure being exerted on said wad by said feeding means.

19. In a baling-press, the combination with means for forming a wad, means for forming said wad into a bale, mechanism for forcing said wad under pressure to said bale-forming means and for preventing the exertion of more than a predetermined pressure on said wad.

20. In a baling-press, the combination with a platen, of means for operating the same, means for forming a wad, mechanism for forcing said wad under pressure to said platen, and means for preventing the exertion of more than a predetermined pressure on said wad, said platen operating to form said wad into a bale.

21. In a baling-press, the combination with a platen provided with an aperture therein, of means for operating said platen, of means for forming a wad, mechanism for feeding said wad under forcing pressure through said aperture in said platen, and means for preventing the exertion of more than a predetermined pressure on said wad, said platen operating to form said wad into a bale.

22. In a baling-press, the combination with means for semicompressing material to be pressed into a continuous wad, and means which comprise a plurality of movable members for forming the wad into a bale without relieving the pressure on the wad.

23. In a baling-press, the combination with means for semicompressing material to be pressed into a continuous wad, of a platen which is composed of a plurality of movable members, and means for positively operating said members for forming the wad into a bale without relieving the pressure on the wad.

24. In a baling-press, the combination with a reciprocating platen which is composed of a plurality of movable members, of means for positively revolving said members, means for semicompressing material to be pressed into a wad, and means for feeding the wad under the members of the platen under continuous pressure, said platen operating by its reciprocation to form the wad into a bale.

25. In a baling-press, the combination with a platen composed of a plurality of movable members having an aperture between two of said members, means for operating said platen, means for semicompressing material to be pressed in a wad, and feeding said wad through the aperture and under the members under continuous pressure, said platen operating to form the wad into a bale.

26. In a baling-press, the combination with a reciprocating platen composed of a plurality of movable members, having an aperture between two of said members, means to reciprocate said platen, means for semicompressing material to be pressed into a wad and feeding the wad through said aperture and under the members of the platen under a downward pressure, said platen operating by its reciprocation to form the wad into a bale.

27. In a baling-press, the combination with a platen composed of a plurality of members having an aperture formed between two of said members, a throat mounted in said aperture, means for feeding and constantly forcing a wad of material into said throat, and means to form said wad into a bale without releasing the pressure from said wad.

28. In a baling-press, the combination with a reciprocating platen composed of a plurality of movable members having an aperture formed between two of said members, a throat mounted in said aperture, means for forming a wad, means for constantly forcing said wad into said throat, and means to reciprocate said platen to form said wad into a bale, said bale being formed without relieving said wad from pressure.

29. In a baling-press, the combination with a pressure-head, of a platen, means for forming a wad, means for feeding said wad under a constant forcing pressure between said platen and pressure-head, means connected to said platen for stopping and starting the means for feeding the material at each movement of the platen.

30. In a baling-press, the combination with a pressure-head, of a reciprocating platen, means for forming a wad, means for feeding said wad under a constant forcing pressure between said platen and pressure-head, means connected to said reciprocating platen for stopping and starting the means for feeding the material at each reciprocation of the platen.

31. In a baling-press, the combination with a pressure-head, of a reciprocating platen, a throat, rolls for feeding material into the throat, to form a wad, said wad being delivered between the pressure-head and the platen under a constant forcing pressure, ratchets coöperating with said rolls for revolving the rolls in only one direction irrespective of the reciprocation of the platen, and means for imparting motion to the rolls from the reciprocation of the platen.

32. In a baling-press, the combination with a pressure-head, of a reciprocating platen composed of two sets of movable members, having an aperture between the two sets of members, a throat fitted into said aperture, means for forming a wad, means for feeding said wad under a constant forcing pressure into said aperture, and between the pressure-head and the platen, means for imparting motion to said feeding means only when the platen is reciprocated, said means being controlled by the reciprocation of the platen.

33. In a baling-press, the combination with a pressure-head, of a platen composed of a plurality of movable members positively moved, a track engaging the outside of the members to move them, means connected to the track for reciprocating the platen, a frame, antifriction devices interposed between the track and the frame, means for forming a wad, and means for feeding said wad under a constant forcing pressure between the members and the pressure-head, said means being operated from one of the members of the platen.

34. In a baling-press, the combination with a pressure-head, a movable platen, means for forming a wad, and means for feeding said wad under a constant forcing pressure between the pressure-head and the platen only when the platen is moved.

35. In a baling-press, the combination with a pressure-head, of a reciprocating platen, composed of a plurality of revolving members, means for positively revolving and advancing the members in the direction of the reciprocation of the platen, means for reciprocating the platen, means for forming a wad, means for feeding the wad under a constant forcing pressure between the members and the pressure-head, and means receiving its power from one of the members for stopping the feed at the termination of each reciprocation.

36. In a baling-press, the combination with a pressure-head, a reciprocating platen, means for forming a wad, means for feeding said wad under a constant forcing pressure between the platen and the pressure-head, means to stop said feeding mechanism at the termination of each reciprocation of the platen and means for starting said feeding mechanism at the beginning of the next successive reciprocation of the platen.

37. In a baling-press, the combination with a pressure-head, of a reciprocating platen, means for forming a wad, and means for feeding said wad under a constant forcing pressure between said pressure-head and platen, the movement of said wad-feeding means being controlled by the reciprocation of the platen.

38. In a baling-press, the combination with a pressure-head, of a reciprocating platen composed of a plurality of revolving members, side plates having openings to receive said members, sills, said side plates being supported by the sills, means for revolving the members, means for forming a wad, and means for feeding said wad under a constant forcing pressure between the members and the pressure-head to form a bale.

39. In a baling-press, the combination with a reciprocating platen composed of two sets of revolving members, having an aperture formed between the two sets of members, means for positively revolving the members in series, and means for semicompressing material to be pressed into a wad and simultaneously forcing said wad under pressure between the members and the pressure-head to form a bale.

40. A baling-press comprising a pressure-head, a platen composed of a plurality of movable means, means for engaging each of the movable means for positively moving them, means for maintaining the movable means in a predetermined relationship one with the other, means for forming a wad, and means for feeding said wad under a constant forcing pressure between the platen and the pressure-head to form a bale.

41. In a baling-press, the combination with a pressure-head, of a platen composed of a plurality of revolving members, means for reciprocating said platen, movable means for positively and simultaneously revolving and advancing said members, an aperture being formed between two of said members, means for forming a wad, and means for feeding said wad under a constant forcing pressure through said aperture and between the members and the pressure-head to form a bale.

42. In a baling-press, the combination with a pressure-head, of a reciprocating platen composed of a plurality of revolving members, means for reciprocating the platen, two sets of means engaging each member at opposite points to advance and revolve it in the direction of the reciprocation of the platen, and means for feeding material between the members and the pressure-head.

43. In a baling-press, the combination with a pressure-head, of a platen composed of a plurality of revolving members, means for moving the platen, means for advancing the members and simultaneously revolving said members, said means comprising a fixed set of teeth and a movable set of teeth engaging openings in the members, and means for feeding material between the pressure-head and the platen to form a bale.

44. In a baling-press, the combination with a pressure-head, of a reciprocating platen composed of a plurality of revolving members having peripheral openings at or near their ends, a series of stationary teeth engaging one or more of the openings, a series of movable teeth engaging one or more of the openings, the teeth positively revolving and advancing the members in the direction of the reciprocation of the platen.

45. In a baling-press, the combination with a pressure-head, of a reciprocating platen composed of a plurality of revolving members, stationary means engaging the outside of the members for the latter to travel against, movable means engaging the members at another point to revolve said members, means for reciprocating the platen, and means for feeding material between the members and the pressure-head to form a bale.

46. In a baling-press, the combination with a pressure-head, of a reciprocating platen composed of two sets of revolving members, having an aperture between the two sets of members, a stationary track positively engaging the members, a movable track positively engaging the members, said tracks positively revolving the rolls uniformly, means for reciprocating the platen, and means for feeding material through the aperture and between the pressure-head and the members to form a bale.

47. In a baling-press, the combination with a pressure-head, a reciprocating platen composed of two sets of revolving members, having an aperture between the two sets of members, a stationary track positively engaging the outside of the members, a movable track for positively engaging the outside of the members, said latter track advancing and revolving the members in the direction of the reciprocation of the platen, and means for feeding material to be baled through the aperture and between the pressure-head and the members to form a bale.

48. In a baling-press, the combination with a pressure-head, of a reciprocating platen composed of a plurality of revolving members, stationary means positively engaging the members for maintaining said members in a predetermined relationship one with the other, movable means positively engaging the members to positively revolve said members, a frame, a traveling frame carrying antifriction devices intermediate the movable means which engage the members and the frame, means for reciprocating the platen, and means for feeding material between the members and the pressure-head to form a bale.

49. In a baling-press, the combination with a pressure-head, of a platen composed of a plurality of revolving members, means for reciprocating the platen, stationary means for engaging the outside of the members, traveling means for engaging the members at a point opposite the point of engagement of the stationary means, a frame, an antifriction device interposed between the movable means which engages the members and the frame, said antifriction device being free to move with the reciprocation of the platen, and means for feeding material between the pressure-head and the platen to form a bale.

50. In a press, the combination with rolls for forming and feeding a wad, one of said rolls having bearings mounted on yielding arms, of means for regulating the tension of said arms, means for compressing the wad into a bale, the yielding arms moving when the wad has reached a predetermined pressure.

51. In a baling-press the combination with a platen, and means to operate the same, of a pair of rolls for forming and feeding a wad under constant pressure throughout its whole extent to said platen, said wad being formed into a bale by said platen without the pressure on said wad being relieved.

52. In a baling-press the combination with means for forming a bale, of a platen having an aperture therein, and means to constantly force material to be baled into said aperture under a constant forcing pressure.

53. In a baling-press the combination with a platen having an aperture therein and means for operating said platen, of means for forming and maintaining a wad under pressure, and means for forcing said wad (without relieving the pressure thereon) through said aperture and into position to be acted on by said platen.

54. In a baling-press, a pressure-head in combination with a platen consisting of a series of rolls suitably mounted to reciprocate and having a central throat with means to form a wad therein, means for feeding said wad under a constant forcing pressure between the rolls and platen, and means to positively revolve said rolls to reciprocate said platen.

55. In a baling-press, a pressure-head in combination with a platen consisting of a series of rolls suitably mounted to reciprocate and having a central throat with means to form a wad therein, means for feeding said wad under a constant forcing pressure between the rolls and platen, and means to positively revolve said rolls by operating on the periphery of each roll, through means adapted to revolve the same to reciprocate said platen.

56. In a baling-press, a pressure-head in combination with a platen consisting of a series of rolls suitably mounted to reciprocate and having a central throat with means to supply material to be compressed to said throat, and means engaging each roll at two opposite points to positively revolve said rolls.

57. In a baling-press, a pressure-head in combination with a platen consisting of a series of rolls suitably mounted to reciprocate and having a central throat with means to supply material to be compressed to said throat, and means to positively revolve said rolls by means of a movable and a stationary rack operating on the periphery of said rolls.

58. In a baling-press, the combination with a pressure-head, a movable platen means to form a wad, and means for feeding said wad under a constant forcing pressure between the pressure-head and the platen during a predetermined part of the movement of the platen.

59. In a baling-press, a series of reciprocating rolls, a stationary track and a movable track for the said rolls in combination with means for operating the movable track for the purpose of reciprocating the rolls.

60. In a baling-press, a series of reciprocating rolls, a stationary and a movable track for said rolls; means for operating the movable track for the purpose of reciprocating the rolls, in combination with a pressure-head located on the same side of the rolls as the stationary track.

61. In a baling-press, a series of reciprocating rolls, a stationary track and a movable track for said rolls, means for operating the movable track for the purpose of reciprocating the rolls; a pressure-head exerting pressure through the rolls against the movable track, and a friction-relieving device for the moving track.

62. In a baling-press, a series of reciprocating rolls, a toothed stationary and movable track on opposite sides of the series of rolls, coöperating teeth in the rolls; means provided in the rolls for engaging the teeth, and a device for operating the movable track for the purpose of reciprocating the rolls.

63. In a baling-press, a series of reciprocating rolls, a stationary track or tracks, said rolls bearing upon the track, a pressure-resisting medium for receiving the pressure of the rolls and a plurality of movable tracks between the rolls and the pressure-resisting medium, said latter tracks engaging the rolls on the side opposite that engaged by the stationary tracks.

64. In a baling-press, a series of reciprocating rolls, a stationary track or tracks, said rolls bearing upon the track, a pressure-resisting medium for receiving the pressure of the rolls and a plurality of movable tracks between the rolls and the pressure-resisting medium, said latter tracks engaging the rolls on the side opposite that engaged by the stationary tracks in combination with means for moving one of the tracks for the purpose of reciprocating the rolls.

Signed by me at New York city, New York, this 1st day of July, 1902.

CHARLES J. LUCE.

Witnesses:
SIDNEY R. PERRY,
EMMA W. FINLAYSON.